(12) United States Patent
Fan et al.

(10) Patent No.: US 6,224,839 B1
(45) Date of Patent: May 1, 2001

(54) METHOD FOR THE TREATMENT OF ACTIVATED CARBONACEOUS MATERIAL CONTAINING ALKALI/ALKALINE EARTH METALS FOR THE REDUCTION OF $NO_x$ FROM FLUE GAS

(75) Inventors: Liang-Shih Fan, Dublin; Himanshu Gupta, Columbus, both of OH (US)

(73) Assignee: The Ohio State University, Columbus, OH (US)

( * ) Notice: Subject to any disclaimer, the term of this patent is extended or adjusted under 35 U.S.C. 154(b) by 0 days.

(21) Appl. No.: 09/498,232

(22) Filed: Feb. 3, 2000

(51) Int. Cl.$^7$ .......................................................... B01J 8/00
(52) U.S. Cl. .......................................................... 423/239.1
(58) Field of Search ................................ 423/239.1, 235, 423/213.2

(56) References Cited

U.S. PATENT DOCUMENTS

| | | | |
|---|---|---|---|
| 3,864,450 | * | 2/1975 | Takeyama et al. ............... 423/239.1 |
| 4,174,373 | * | 11/1979 | Yoshida et al. .................... 423/239.1 |
| 4,212,854 | * | 7/1980 | Maki et al. ............................ 423/247 |
| 4,215,096 | * | 7/1980 | Sinha et al. ........................... 423/241 |
| 4,772,455 | * | 9/1988 | Izumi et al. .......................... 423/210 |
| 4,855,276 | * | 8/1989 | Osbourne et al. ................... 502/415 |
| 5,186,914 | * | 2/1993 | Yoshihiro et al. ................ 423/239.1 |
| 5,492,676 | * | 2/1996 | Katatani et al. ..................... 422/168 |

FOREIGN PATENT DOCUMENTS

| | | | |
|---|---|---|---|
| 33 35 499 | * | 4/1985 | (DE) . |
| 0 467 526 | * | 1/1992 | (EP) . |
| 63-171623 | * | 7/1988 | (JP) . |
| 10-15353 | * | 1/1998 | (JP) . |

* cited by examiner

Primary Examiner—Tom Dunn
(74) Attorney, Agent, or Firm—Standley & Gilcrest LLP

(57) ABSTRACT

Economical $NO_x$ reduction from the flue gas is essential for the long-term profitability and existence of fossil fuel based thermal power plants. The proposed process describes the application of activated carbonaceous materials for the post-combustion control of nitric oxide ($NO_x$) emissions from flue gas. Integral experiments were carried out on a variety of carbonaceous species such as graphite, activated carbons and coal char. A selectivity parameter (g carbon consumed/g NO reduced) has been used as a basis for quantifying the effect of the various parameters such as oxygen concentration, alkali impregnation and temperature of reaction on the carbon-NO selectivity. The reaction between pure structured carbon (graphite) required very high temperature. The reaction rate with char and activated carbon was determined to be higher compared to the rate with graphite. The reaction temperature was significantly reduced by the impregnation of carbons with alkali metals. For a given carbon, the selectivity of the carbon-NO reaction increased with temperature. The effect of initial surface area of the carbon was also studied on sodium carbonate impregnated activated char. It was seen that a higher initial surface area increased the selectivity of carbon-NO reaction.

13 Claims, 14 Drawing Sheets

TPR of NO on Graphite [Flow: 100ml/min; Inlet NO Conc: 3156 ppm; Wt. Of Carbon: 55mg]

TPR of NO on SXO Activated Carbon [Flow: 200 ml/min; Inlet NO Conc: 1052 ppm; Wt. Of Carbon: 300mg]

Effect of Temperature on the Isothermal
Reduction of NO on SXO Activated Carbon
[Flow: 200 ml/min; Wt. Of Carbon: 300 mg]

TPR of NO on Coal Char [Flow: 200 ml/min; Inlet NO Conc: 1246 ppm; Wt. Of Carbon: 150 mg]

TPR of NO on Coal Char in the presence of Oxygen
[Flow: 200 ml/min; Inlet NO Conc: 1209 ppm; Inlet Oxygen Conc: 0.85%; Wt. Of Carbon: 300 mg]

Effect of Oxygen Concentration on the
Isothermal Reduction of NO on Coal Char
[Flow: 200 ml/min; Inlet NO Conc: 1300 ppm;
Wt. Of Carbon: 150 mg; Temperature: 700°C]

Effect of Temperature on the Isothermal Reduction of NO on SXO Activated Carbon [Flow: 200 ml/min; Inlet NO Conc: 1300 ppm; Wt. Of Carbon: 150 mg; Oxygen Concentration: 1.45%]

Isothermal Reduction of NO on a variety of carbons [Flow: 200 ml/min; Inlet NO Conc: 1300 ppm; Wt. Of Carbon: 150 mg; Oxygen Conc: 1.45%; Temperature: 700°C]

TPR of NO on Impregnated PAC 200 activated carbon [Flow: 200 ml/min; Inlet NO Conc: 1246 ppm; Wt. Of Carbon: 150 mg; Oxygen Conc: 2.365%]

Comparison of Impregnated PAC 200 activated carbon on the Isothermal Reduction of NO on Impregnated [Flow: 200 ml/min; Inlet NO Conc: 1246 ppm; Wt. Of Carbon: 150 mg; Temperature: 400°C]

Effect of Temperature on the Isothermal Reduction of NO on NaOH impregnated PAC 200 activated carbon [Flow: 200 ml/min; Inlet NO Conc: 1246 ppm; Wt. Of Carbon: 150 mg]

Effect of bed height on the Isothermal Reduction of NO on NaOH impregnated PAC 200 activated carbon [Flow: 200 ml/min; Inlet NO Conc: 1246 ppm; Wt. Of Carbon: 150 mg; Temperature: 400°C]

Effect of initial surface area on the Isothermal Reduction of NO on activated char [Flow: 1000 ml/min; Inlet NO Conc: 1000 ppm; Wt. Of Carbon: 800 mg; Oxygen Conc: 2%; Temperature: 700°C]

METHOD FOR THE TREATMENT OF ACTIVATED CARBONACEOUS MATERIAL CONTAINING ALKALI/ALKALINE EARTH METALS FOR THE REDUCTION OF $NO_x$ FROM FLUE GAS

TECHNICAL FIELD

The invention relates to the method used for removing $NO_x$ from a combustion exhaust gas in an oxidizing atmosphere.

BACKGROUND

High temperature combustion of fossil fuels leads to the formation of a variety of oxides of nitrogen such as nitric oxide (NO) and nitrogen dioxide ($NO_2$) collectively known as $NO_x$. The oxidation of nitrogen (in the combustion air) and the fuel-bound nitrogen leads to the formation of $NO_x$. High combustion temperatures lead to the formation of NO (observed in pulverized coal combustion). The oxidation of the emitted NO by atmospheric oxygen and ozone (photocatalytic reaction) leads to the formation of nitrogen dioxide ($NO_2$) at ambient temperature in the atmosphere. A third type of nitrogen oxide ($N_2O$) is formed by low temperature coal combustion (such as in fluidized bed combustors).

These gases have adverse effects on human and plant life and create well-documented pollution problems. NO forms methemoglobin in blood thereby reducing its oxygen carrying capacity. $NO_2$ is the leading cause of smog and ozone that attack the respiratory tract. It also leads to the formation of acid rain. $N_2O$ has a long life in the atmosphere and its accumulation increases the heat retention capacity of the atmosphere through the greenhouse effect. Given these adverse effects, state and federal regulations to curb the emission of $NO_x$ have been enacted. The first of these came into effect in 1969 in Ventura County, California and have continuously become more stringent.

The emission of $NO_x$ has exceeded 20 million tons annually in the US alone. Statistics show that 45% of this amount is emitted by trucks, and 32% of is emitted from thermal power plants. Internal combustion engines, industrial boilers, process heaters and gas turbines make-up the balance [Baumbach, G., *Air Quality Control*, 1996]. The regulatory bodies have targeted the major sources of $NO_x$ such as stationary power plants and automobiles for the past 15 to 20 years. Regulations are being enacted to continually bring down the level of emitted NOx. Recently, 392 power plants in 22 states were ordered to curtail the $NO_x$ emissions by 50% by March 2003. This translates to a reduction in the $NO_x$ emitted by about 500,000 tons at a cost of about $2,000/ton $NO_x$ reduced. In the face of the impending, stringent $NO_x$ regulations, economical $NO_x$ removal from flue gas is thus essential for the long-term economic viability of the fossil fuel based thermal power plants.

Extensive investigations have been done in the area of $NO_x$ abatement. Primary abatement measures target the reduction of $NO_x$ in the combustion unit. These techniques involve lowering the combustion temperature by staged combustion, burner out of service (BOOS), lower air preheating, flue gas re-circulation and the use of low-$NO_x$ burners [Muzio, L. J. and Quartucy, G. C., *Prog. Energy Combustion Science*, 23, 233–266, 1997]. Although these modifications are relatively inexpensive, the percent $NO_x$ reduction achieved by these primary measures is only 35–45%, and they are thus unable to achieve compliance. Additional fuel can be injected over the combustion zone to create a reducing atmosphere where the fuel (coal/gas) reacts with NO to form $N_2$ and $CO/CO_2$ at high temperature of 1100° C. [Chen, W. and Ma, L., *AIChE J.*, 42(7), 1968–1976, 1996; Burch et al., *Combustion and Flame*, 98, 391–401, 1994]. This re-burning technique suffers from the potential formation of side products such as HCN and $NH_3$.

To achieve compliance, secondary measures such as Selective Non-Catalytic Reduction (SNCR) were introduced in 1970. SNCR involved the reduction of NO to nitrogen gas using reducing agents such as ammonia and urea at an optimum temperature in the 850–1000° C. range. This technique, being temperature sensitive, leads to ammonia slippage (at lower temperature) and conversion to NO itself (at higher temperature) [Gullet et al., *Ind. Eng. Chem. Res.*, 31(11), 1992]. Complimentary processes such as Selective Catalytic Reduction (SCR) achieve similar reduction by catalysis. Some of the common catalysts employed being molecular sieves, metal and metal oxides, supported on alumina, silica or titania. These catalysts reduce the operating temperature of the reduction processes from 850–1000° C. down to 280–450° C. The SCR technique entails huge capital and operational costs due to the additional reductant and catalyst requirements [Cho, S. M., *Chem. Eng. Progress*, January, 1994]. Other relatively benign reductants like CO, $H_2$, $CH_4$ and acetone suffer from higher selectivity to oxygen in the flue gas [Tsujimura et al., *J. Chem. Eng. of Japan*, Vol. 16, No. 2, 1983; Jang et al., *Energy and Fuels*, 11, 299–306, 1997]. Mature SCR technologies also suffer from gas phase poisons such as sulfur dioxide and arsenic, which lead to the formation of ammonium bisulfite and oxidize sulfur dioxide to $SO_3$, complicating $SO_x$ removal downstream. Being temperature sensitive, these technologies do not adapt well to changing boiler load conditions.

Carbon-based technologies have also been used for $NO_x$ reduction. At high temperatures, micronized coal has been demonstrated as a re-burning fuel in fossil fuel fired boilers to reduce NO. Combined $SO_x/NO_x$ processes have been developed where carbon is used as a catalyst for the reduction with ammonia at temperatures below 200° C. [Hjalmarsson, A. K., $NO_x$ Control Technologies for Coal Combustion, *IEACR/24*, IEA Coal Research, 1990]. However, recent studies have spurred the development of another carbon-based technology.

Below ambient temperature, NO adsorbs physically and reversibly on carbon, and the adsorbed NO can be released via thermal desorption. However, the concentration of physically adsorbed NO falls with rising temperature and this phenomenon is virtually nonexistent in the range of temperature of greatest interest (300–800° C.) [Teng, H. and Suuberg, E. M, *Ind. Eng. Chem. Res.*, 32, 416423, 1993]. In the temperature range of greatest interest, Smith et al. in *J. Phys. Chem.*, 63, 544 (1959), carried out one of the seminal works. They showed that below 200° C., NO forms nitrogen molecules and carbon-oxygen complexes by the dissociative chemisorption of NO. The activation energy for the chemisorption was determined to be 15–18 kcal/mole. Further NO reduction does not occur at the low temperature due to the saturation of the surface. A continuous sustained reaction proceeds only at a higher temperature (450° C. and above) because of the creation of fresh active sites by continuous thermal desorption of these complexes. The products of the reaction are $N_2$, CO and $CO_2$. The regeneration of carbon requires higher activation energy of 45–60 kcal/mole. It has been observed that the complexes desorbing from the surface are in the form of CO and $CO_2$. Based on these observations, it has been widely proposed that the complexes formed as a result of chemisorption be denoted as C(O) and C(O2). It has also been observed that the $CO_2$ starts evolving at a lower temperature than the CO species [Furusawa et al., *International Chemical Engineer*, Vol. 20, No. 2, 1980; Chan et al., *Combustion and Flame*, 52, 37–45, 1983]. Once the spent carbon has been regenerated, the $NO_x$ reduction can proceed again. This hypothesis is accepted widely even today [Illan-Gomez et al., *Energy and Fuels*, 10, 158–168,1996].

Some inorganic species have been known to catalyze the NO/carbon by lowering the reaction temperature. These inorganic constituents could be either inherently present or deliberately added to the carbon matrix. Chan et al. (see above cited reference) observed that the char with high ash content catalyzed the $NO_x$ reduction. They noted that the ash, rich in ion exchangeable calcium might be responsible for the catalytic effect. Alkali and alkaline earth metals have been proven catalysts in coal gasification, water gas shift reaction and methanation of CO which necessitate oxygen transfer between the gaseous reactant and carbon. With this premise, studies have been done on carbon impregnated with K, Ca, etc. The catalytic role of calcium in char oxidation has been well established through a series of studies involving impregnation/ion-exchange techniques [Radovic et al., *J. Catal.*, 82, 382, 1983; Hengel, T. D., and Walker P. L., *Fuel*, 63, 1214, 1984; Levendis et al., *Ener. Fuels*, 3, 28, 1989; Gopalakrishnan et al., *Energy and Fuels*, 8, 984, 1994]. Researchers have shown that by integrating these inorganic species into carbon matrix the NO-carbon interaction takes place via an alternate pathway thus reducing the temperature of chemisorption [Kapteijn et al., *J. Chem. Soc., Chem. Commun.*, 1084, 1984].

It is known that the $O_2$/char interaction rate is much higher than the NO/char reaction [Chan et al. in above cited reference]. The presence of oxygen in the range of 0.1–2% enhances NO reduction. This occurs by the low temperature gasification of carbon by oxygen leading to the creation of active sites [Suzuki et al., *Ind. Eng. Chem. Res.*, 33, 2840–2845, 1994]. But in the presence of 5% oxygen, the carbon starts reacting with the oxygen preferentially leading to a loss in carbon and thus a loss in the overall reduction of NO. The influence of metal impregnants on NO-carbon reaction in the presence of oxygen has also been studied. Copper (impregnated as Cu), Ni [Yamashita et al., *Applied Catalysis*, 78, 1991], calcium (in the form of CaO) [Yamashita et al. in above cited reference; Illan-Gomez et al. in above cited reference] and potassium [Illan-Gomez et al. in above cited reference] have all been shown to promote reactivity of carbon. Yamashita et al. (in above cited reference) have shown that with the metal-catalyzed carbon, the C—NO reaction takes place at much lower temperatures of about 300–500° C. and is promoted by the presence Of $O_2$. The reduction of NO was further enhanced in the presence of a metal, with the order of reactivity being Ni>Ca>Cu in the absence of oxygen and Cu>Ca>Ni in the presence of oxygen. As in the case of un-catalysed reaction, it was seen that the presence of oxygen in minute quantities enhanced the NO reduction while higher oxygen concentrations led to a loss in carbon due to the increased reaction of carbon with oxygen. The presence of surface species such as $Cu_2O$ and CuO proves that the pathway for the oxygen molecules reaching the active sites on carbon has been altered.

Given the vast literature available, the focus of the present invention was to enhance the selectivity of the carbon-NO reaction in the presence of oxygen. The present invention aims to quantify the effect of the various gaseous (gas concentrations, reaction temperature) and solid (type of carbon, surface area, impregnate type, extent of impregnation, etc.) operating parameters on the selectivity. The experiments did not involve any pretreatment of the carbon involved so as to mimic actual operating conditions in a power plant and minimize pretreatment cost.

A variety of carbonaceous materials have shown NO reduction potential in the presence of oxygen. These include high cost commercially available activated carbons and low cost coal chars. Based on the experimental results obtained, it can be concluded that impregnation of carbon is beneficial in catalyzing the various gasification reactions and lowering the temperature of operation. Calo et al., *Energy and Fuels*, 13, 761–762, 1999, have shown an increase in the rate of NO reduction with increasing surface area as expected. Results obtained in the present invention show that besides the increase in the rate of the NO reduction, the selectivity of the carbon-NO reaction is enhanced as well by the use of a high surface area carbon. Similar conclusion can be drawn about the effect of temperature. Although an increase in temperature enhances both the carbon-NO and the carbon-oxygen reaction, the present invention shows a preferential increase in selectivity of the carbon-NO reaction with increasing temperature. Despite the parasitic consumption of char by oxygen, the requirement of char is only about 8–15 g carbon/g NO reduced. The reasonable requirement of char and the low cost and wide availability of high alkali lignite coal to make these activated chars provides the economic incentive to further develop this technology.

Accordingly, it is an object of the present invention to provide a method for $NO_x$ removal capable of achieving compliance with current environmental standards, with many of the cost and inefficiency disadvantages of prior art methods.

The above cited references are hereby incorporated by reference.

SUMMARY OF THE INVENTION

The present invention includes a method of removing $NO_x$ from a combustion exhaust gas containing oxygen, and a method of combusting coal coupled with a method of removing $NO_x$ from its exhaust gas.

In this method, carbon is used as a reducing agent for $NO_x$ reduction, preferably at a substantially lower temperature (300–800° C.) than that required by re-burning and the $NO_x$ reduction takes place in an oxidizing atmosphere (0–5% oxygen), without the addition of any external reducing agent. The majority of the carbonaceous reductant is consumed by oxygen. The reduction of NO by carbon occurs simultaneously with the carbon-oxygen reaction. Other parasitic side reactions can also occur with moisture and carbon dioxide. The main reactions of interest are:

$$2NO + C \rightarrow CO_2 + N_2 \tag{1}$$

$$2NO + 2C \rightarrow 2CO + N_2 \tag{2}$$

The scavenging side reactions that occur are:

$$C + O_2 \rightarrow CO_2 \tag{3}$$

$$2C + O_2 \rightarrow 2CO \tag{4}$$

$$C + H_2O \rightarrow H_2 + CO \tag{5}$$

$$C + CO_2 \rightarrow 2CO \tag{6}$$

The primary challenge in making the present invention commercially viable involves reducing the consumption of carbon (per ton of NO reduced) by improving the selectivity of the carbon NO reaction in the face of the competing reactions.

There are a number ways for the sorbent of the present invention to be applied to a process system (such as coal and gas burning thermal power plants) generating NOx in the flue gas. For example, pulverized carbon sorbents ($d_p$<50 $\mu$m) can be injected into the combustor or duct region carrying the flue gas stream according to the required reaction temperature range. For a high temperature operation (800–950° C.), the carbon could be injected into the upper furnace region. For medium temperature operation (500–700° C.), the injection could take place near the economizer section. This process parallels existing dry-sorbent injection used for sulfur dioxide capture. Alternately, the $NO_x$ laden flue gas could be exposed to the carbon sorbents loaded in a fluidized bed (300<$d_p$<1000 $\mu$m) or reacted in a circulating fluidized bed (where pressure drop becomes an operating and economical constraint). The particle size in the latter case is usually between 75 to 200 $\mu$m. The required technique can then be chosen from the above methods to reduce $NO_x$ from any configuration of coal combustors (such as pulverized coal combustors, fluidized and circulating fluidized bed combustors and spreader stoker boilers) or gas burning boilers.

As used herein, the term activated carbonaceous material may include, for instance, coal, high alkali coal, various nutshells (coconut, pecan, etc.), carbon fibers, biomass, etc. Alkali and alkaline earth metals may be selected from any metals in Group IA or IIA of the Periodic Table and may, more preferably, include sodium, potassium, calcium and magnesium.

The present method of $NO_x$ removal, in broadest terms, comprises a method of removing nitrogen oxide from a combustion exhaust gas comprising nitrogen oxide, the method comprising, exposing an exhaust gas to an activated carbonaceous material containing at least one element selected from the group consisting of alkali and alkaline earth metals, at sufficient temperature and for sufficient time so as to remove the nitrogen oxide from the combustion exhaust gas.

The activated carbonaceous material, preferably, comprises activated lignite coal. The activated lignite coal comprises sodium present in an amount in the range from about 10% to about 15% by weight, has a porosity in the range from about 0 to about 0.4 cc/g and has an average surface area in the range from about 10 to about 400 m$^2$/g.

The alkali and alkaline earth metal is, preferably, selected from the group consisting of sodium, potassium, calcium and magnesium and is present in an amount in the range from about 0% to about 20% by weight.

Sufficient time and temperature necessary to remove the nitrogen oxide from the combustion exhaust gas are those times and temperatures that are within the range of known engineering standards. Typical exposure time is usually in the order of seconds.

Embodied in the present invention is a method of combusting coal, the method comprising the following steps: (1) combusting coal so as to generate a combustion exhaust gas comprising nitrogen oxide; and (2) exposing the exhaust gas to an activated carbonaceous material containing an element selected from the group consisting of alkali and alkaline earth metals, at sufficient temperature and for sufficient time so as to remove the nitrogen oxide from the combustion exhaust gas.

Also embodied in the present invention is a method of combusting coal further comprising combusting the activated lignite coal following the removal of the nitrogen oxide from the combustion exhaust gas. Preferably, the alkali and alkaline earth metal is selected from the group consisting of sodium, potassium, calcium and magnesium. The alkali and alkaline earth metal is, preferably, present in an amount in the range from about 0% to about 20% by weight.

The temperature is preferably in the range from about 300° C. to about 800° C.

DETAILED DESCRIPTION OF THE PREFERRED EMBODIMENT(S)

In accordance with the foregoing summary, the following presents a detailed description of the preferred embodiment of the invention that is currently considered to be the best mode.

The two types of experiments were conducted in the present invention. During Temperature Programmed Reaction (TPR), the temperature of the bed was continuously increased as the reaction proceeded. By measuring the off-gases from the reactor, it is possible to identify a reaction preferred temperature range. Isothermal reactions were carried out to study the reaction under extended periods of time at a given temperature. Since only integral experiments were carried out, the parameter used to describe the carbon-NO "selectivity" is arbitrarily defined as g carbon required/g NO reduced. An increase in this parameter shows a decrease in the carbon-NO selectivity.

Figure 1:
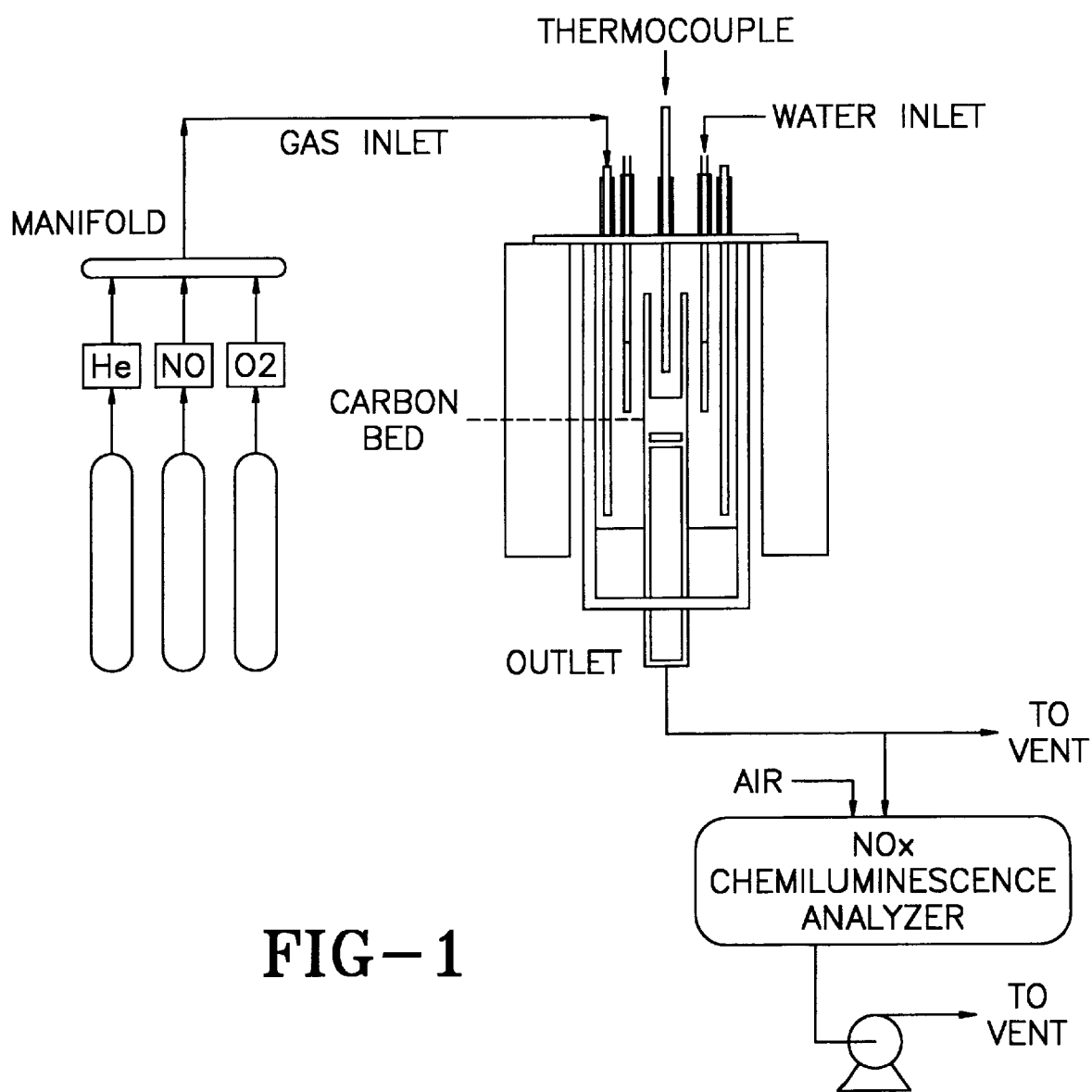
FIG. 1 shows a schematic of a reactor setup in accordance with one embodiment of the present invention.

The inlet gases (helium, nitric oxide and oxygen) were metered by Sierra Mass Flow Controllers. These gases flow into a manifold from which they are sent through the reactor or bypassed for gas analysis. The experiments were carried out in a 2" SS reactor tube housed in a Thermolyne 21100 tube furnace as shown in FIG. 1. The sorbent bed consists of a ⅜" steel tube with a perforated SS disk 2" from the top. The inlet gases were preheated in the annular zone in the 2" tube and then these gases entered the sorbent bed. The gases exiting from the sorbent bed are then analyzed for NO by a Chemiluminescence analyzer (Advanced Pollution Inc., Model 200 AH).

In the present invention, a variety of carbonaceous materials have been utilized for NO reduction. The activated carbons were procured from Calgon Corp., Norit America Inc. and Carbon Corp. (Columbus, Ohio). The different chars were by heating a bed of coal at 950° C. for more than 2 hours in flowing inert gas such as nitrogen or helium. The remaining char (coal devoid of volatile matter) was then allowed to cool and ground and sieved to required sizes. The impregnation of char/activated was carried out by suspending 2 g of char in a 1N solution of the various reagents ($HNO_3$, KCl, NaCl, NaOH and $Na_2CO_3$) and allowed to equilibrate for 100 hours followed by filtration and vacuum drying at 110° C. for 24 hours. The activation of the char was carried out by passing steam and $CO_2$ over a bed of char maintained at 600–900° C. This created the required porosity and pore volume in the char that enhanced the NO-carbon selectivity. The structural properties of the carbons and chars are reported in Table 1.

TABLE 1

| Name of the Carbon | BET Surface area ($m^2/g$) (by Nitrogen adsorption) | Pore Volume (cc/g) |
| --- | --- | --- |
| Graphite | 3 | 0.006 |
| SXO | 818 | 0.49 |
| Norit RBHG | 556 | 0.35 |
| Xtrusorb | 1088 | 0.7 |
| Sorbonorit | 1224 | 0.84 |
| Coal Char | 0.96 | 0.00056 |
| Impregnated Coal Char | 0.989 | 0.00233 |
| Steam Activated Pittsburgh Coal Char | 34.58 | 0.02456 |
| Activated High Sodium Lignite Char | 250 | 0.2246 |

Figure 2:
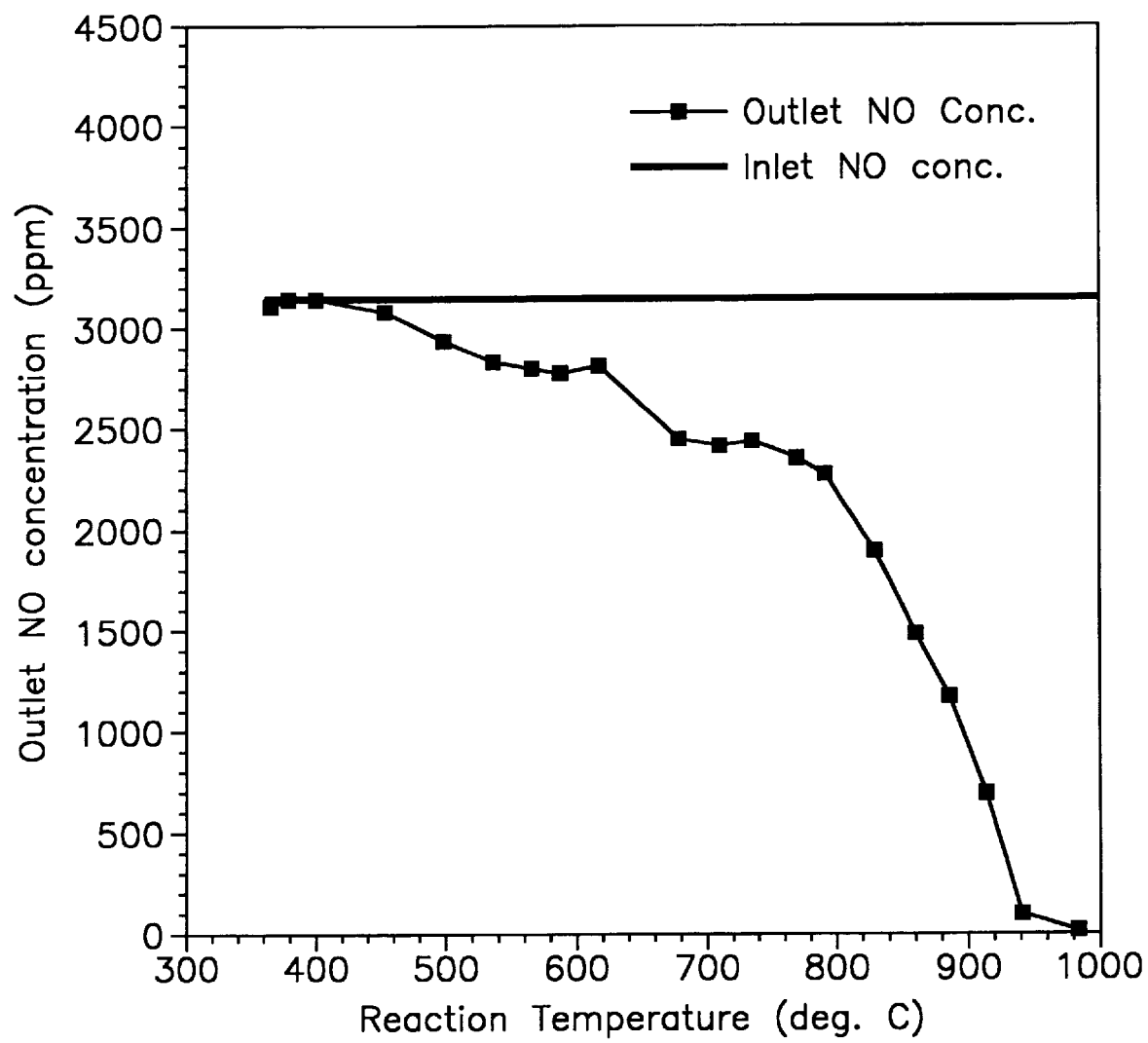
FIG. 2 shows the Temperature Programmed Reduction (TPR) of NO on graphite, in accordance with one embodiment.

Experiments to quantify the "inherent" reactivity between carbon and nitric oxide (NO), in the absence of impurities, mineral matter, impregnates and oxygen were carried out with graphite (99.995% carbon). Temperature Programmed Reduction (TPR) of NO with graphite is shown in FIG. 2. This plot shows that NO reduction starts at 375° C. The reaction proceeds by the dissociative chemisorption of NO on the surface of the carbon. It has been suggested that two nitrogen atoms from the NO molecule combine to form nitrogen molecule, while the oxygen atoms form thermally stable carbon-oxygen complexes on the surface of the carbon. The rate of the NO chemisorption increases till 600° C. Once the surface gets saturated with these carbon-oxygen complexes, the reduction stops, due to non-availability of active surface sites. The rate of any further reaction is governed by rate of thermal desorption of these complexes from the surface in the form of CO and $CO_2$. Hence, the sustained reduction of NO picks up again at 700° C. and the reduction is essentially complete at 1000° C. This shows the high temperature required by the graphite for sustained NO reduction and thus indicates the difficulty associated with the gasification of "pure structured carbons".

Figure 3:
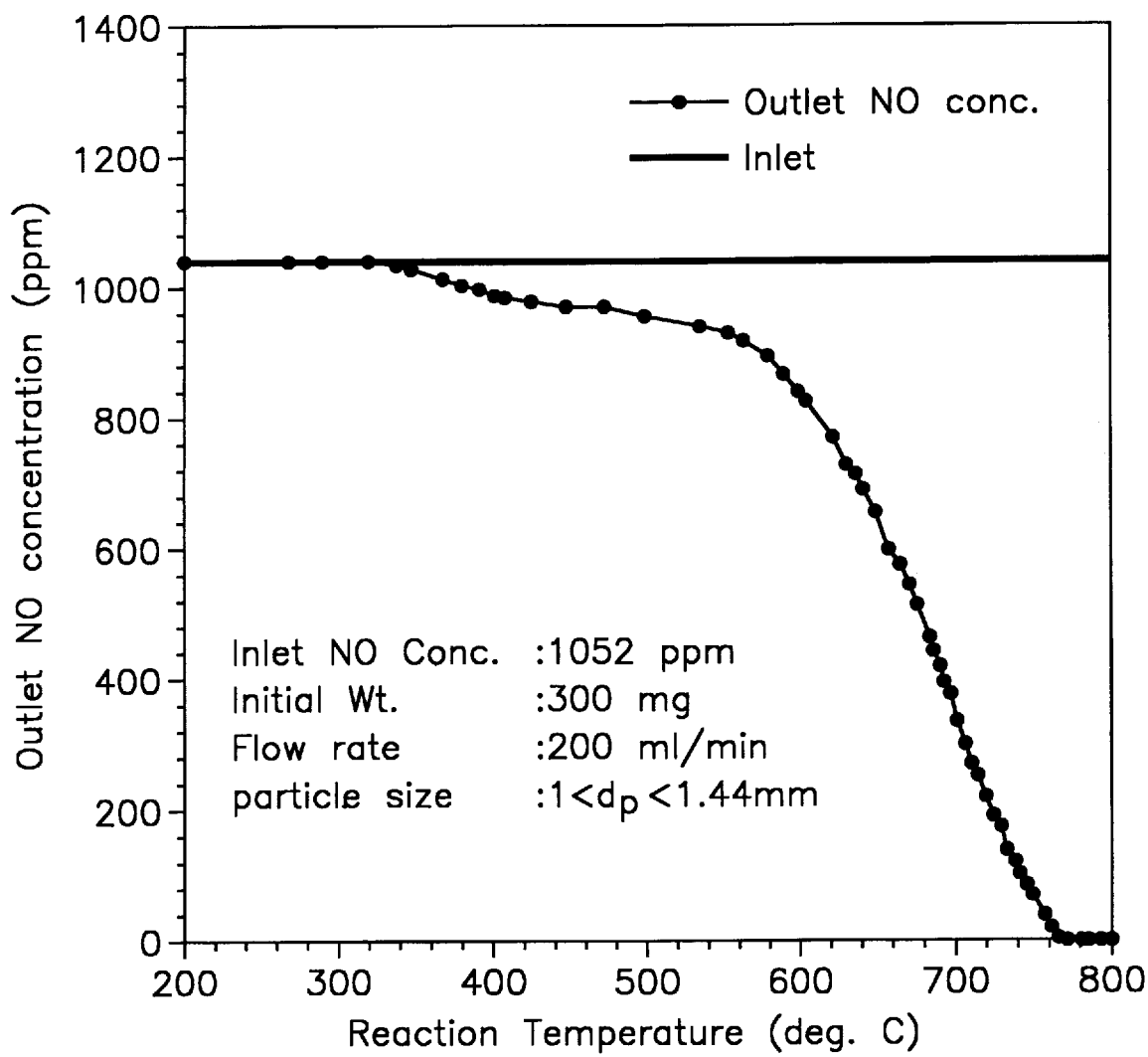
FIG. 3 shows the results of TPR of NO on SXO sample, in accordance with one embodiment.
Figure 4:
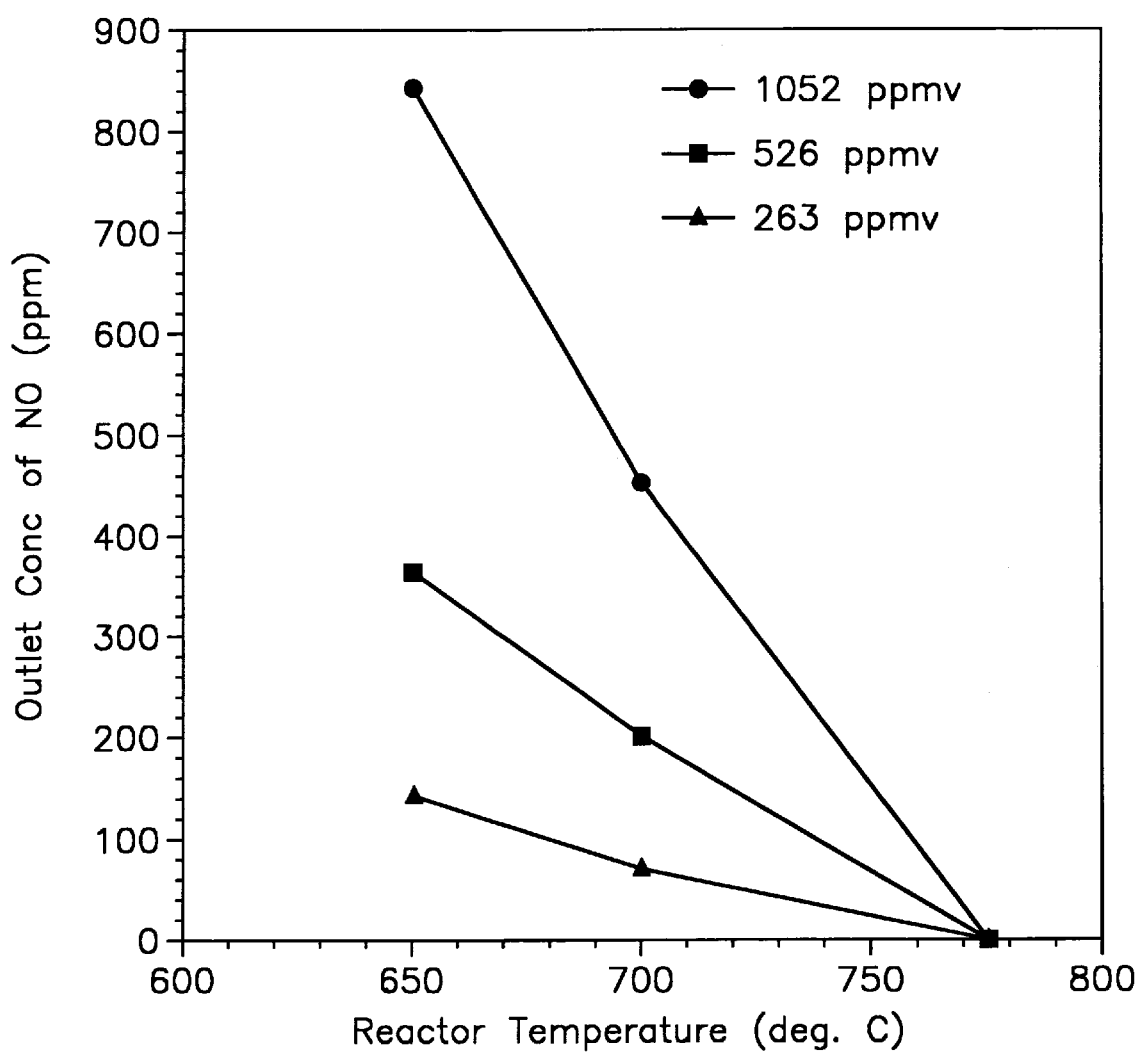
FIG. 4 shows the effect of temperature on the isothermal reduction of NO on SXO sample, in accordance with one embodiment.
Figure 5:
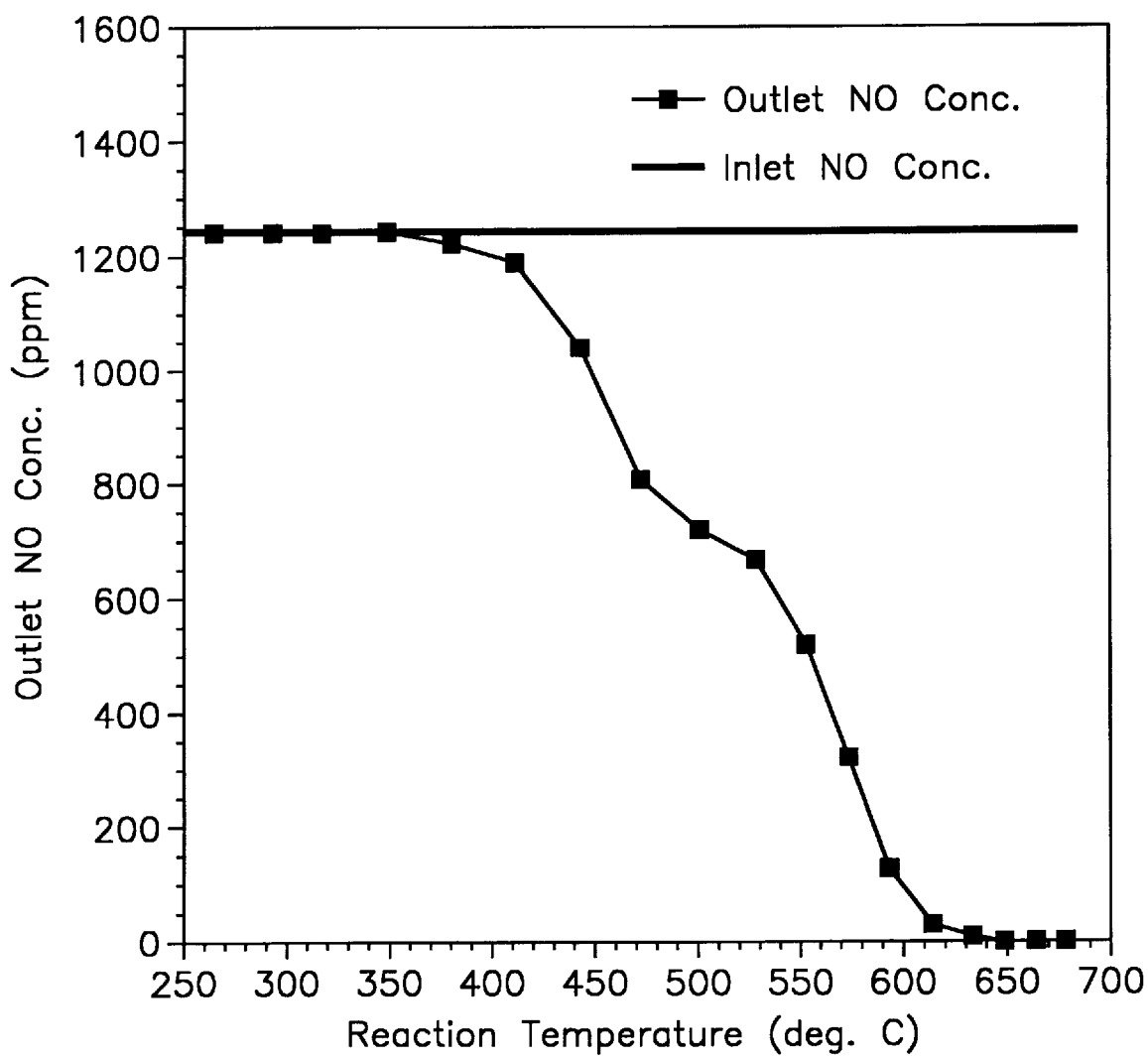
FIG. 5 shows the results of TPR of NO on coal char sample, in accordance with one embodiment.

The TPR experiment was conducted on a high surface area activated carbon (SXO carbon provided by the Carbon Corporation in Columbus, Ohio). The TPR was carried out on 300 mg sample (1.0<dp<1.4 mm) of SXO and the results are shown in FIG. 3. This Figure shows the same trend as seen in the case of graphite, however the temperature window for NO reduction shifted downward from that required for graphite. Here the initial reduction starts at 325° C. and sustained reduction is achieved at 550° C., with complete reduction of NO occurring at 700° C. Long term isothermal behavior of the NO reduction on SXO carbon is shown in FIG. 4. FIG. 4 illustrates the steady state outlet NO concentration for a fixed inlet NO concentration as a function of temperature. One can appreciate that, with increasing sorbent temperature, NO reduction is increased. The extent of thermal desorption of carbon-oxygen complexes in the form of CO and $CO_2$ leads to the exposure of "fresh" active sites on the surface of carbon to sustain the reaction with NO. The behavior of coal char in its capability to reduce NO was also tested. The char was made by devolatilizing Pittsburgh #8 coal under flowing nitrogen. FIG. 5 shows the TPR results in NO and inert helium. A further lowering of the reaction temperature window for sustained NO reduction is observed (450–650° C.).

Figure 6:
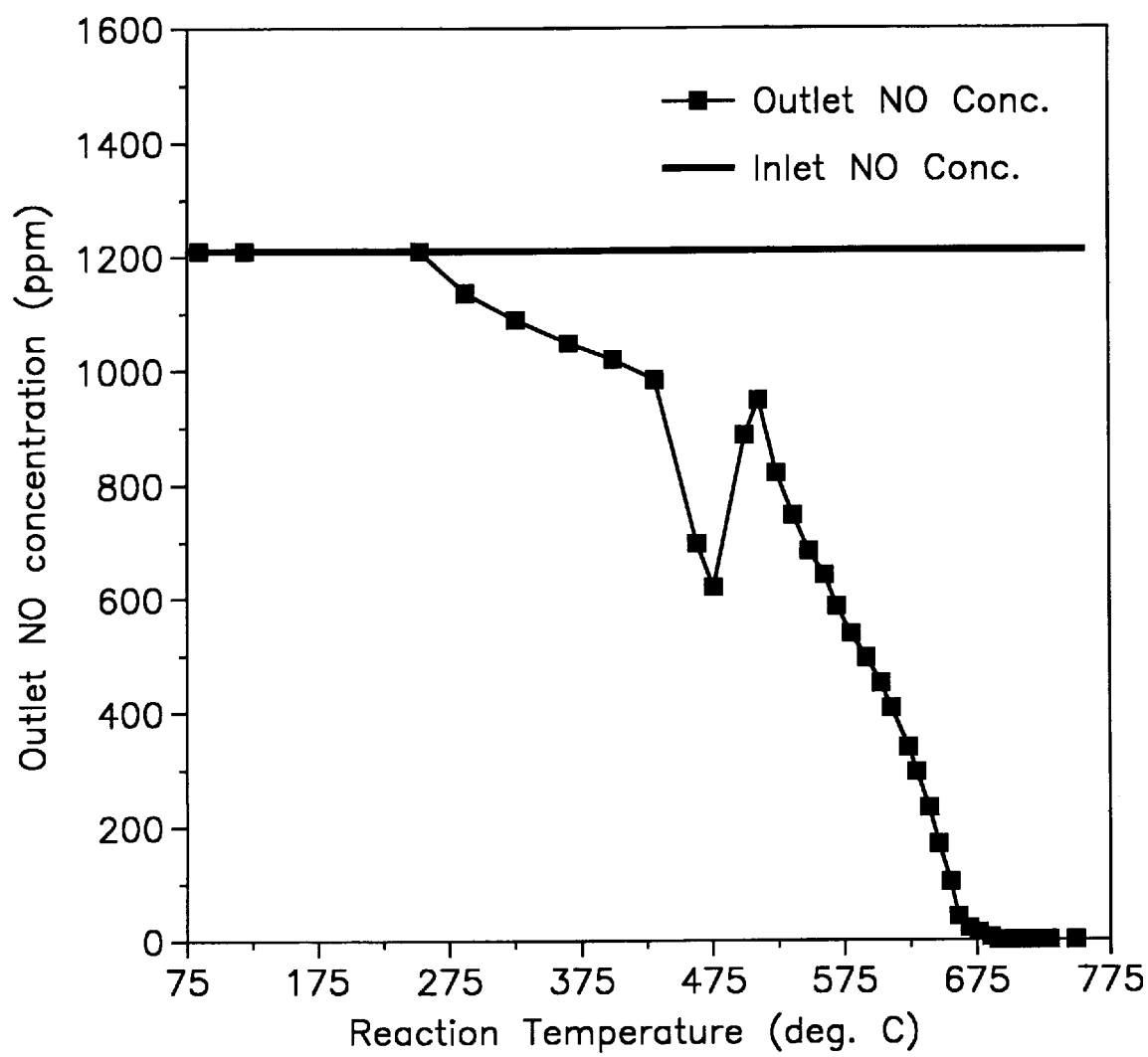
FIG. 6 shows the results of TPR of NO on coal char sample in the presence of oxygen, in accordance with one embodiment.

Experiments were also conducted to quantify the influence of oxygen on the NO reduction by carbon. It is essential to conduct these experiments because the concentration of oxygen (1–5%) in the flue gas is significantly higher than the concentration of NO (250–1000 ppm) and due to the well-known gasifying property of oxygen which leads to a parasitic consumption of carbon. In the presence of oxygen, the gasification of carbon takes place at a lower temperature (300° C. and higher). This "low-temperature" gasification could lead to the exposure of new sites on the surface of carbon, thus enhancing the carbon-NO reaction at lower temperatures. The consumption of carbon is therefore dictated by the selectivity between the carbon-oxygen reaction and the carbon-NO reaction. FIG. 6 shows the TPR between char and nitric oxide in the presence of 0.85% oxygen. It can be seen from this Figure that the reduction of NO starts at a lower temperature of 260° C. The sustained NO reduction occurs at 500–650° C. It is believed that the catalytic effect of oxygen can be explained on the basis of the creation of new sites by the gasification of carbon by oxygen for further carbon-NO reaction. However, this parasitic loss of carbon to oxygen remains a major concern.

Figure 7:
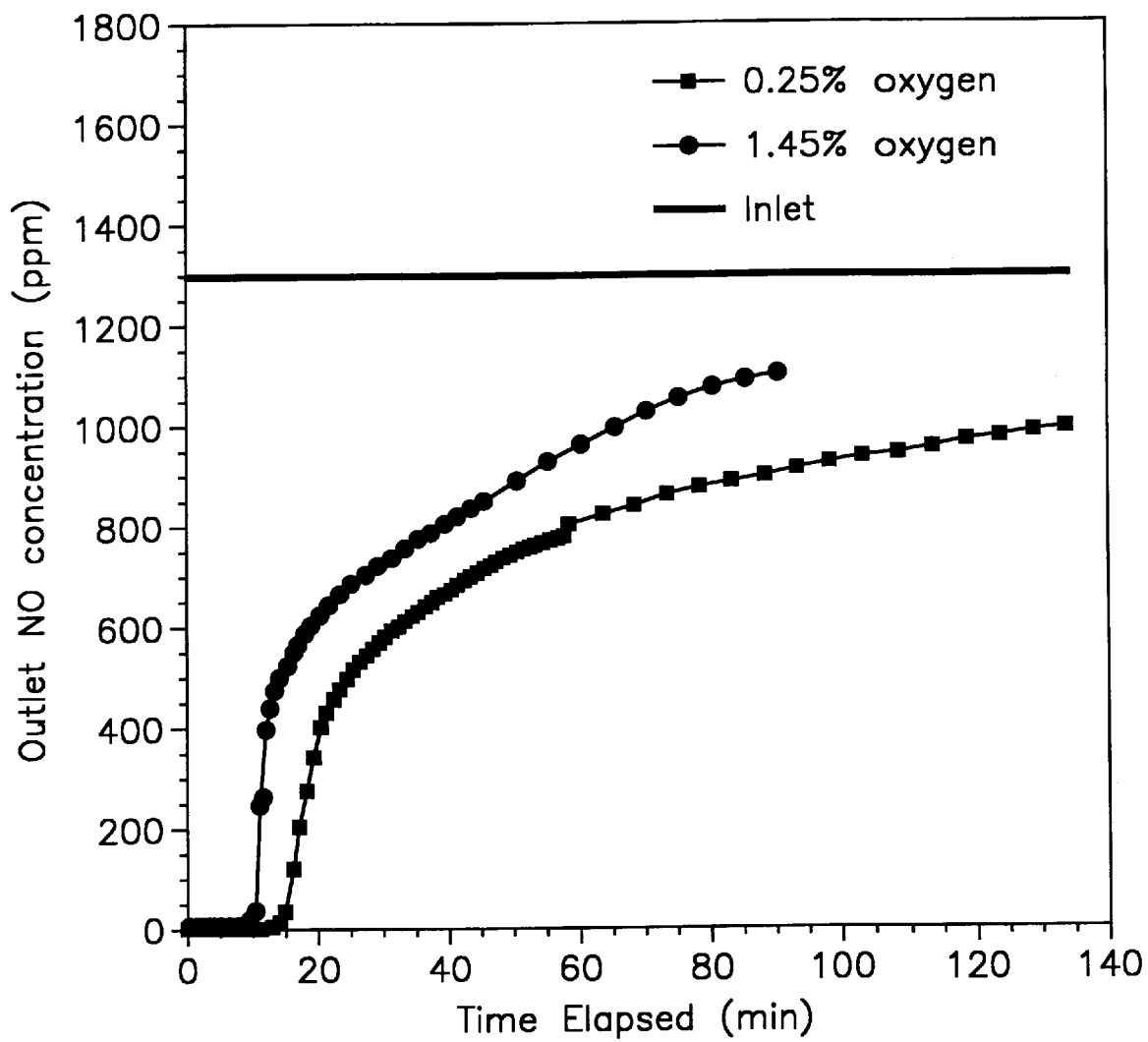
FIG. 7 shows the effect of oxygen concentration on the isothermal reduction of NO on coal char sample, in accordance with one embodiment.

FIG. 7 depicts the $NO_x$ reduction under a range of oxygen concentrations. Higher oxygen concentration leads to faster utilization of carbon as seen from the faster exit time of NO from the reactor. The integral data analysis shows that the consumption of carbon increased from 4 g carbon consumed/g NO reduced to 10.38 g carbon consumed/g NO as the concentration of oxygen increased from 0.25% to 1.45%.

Figure 8:
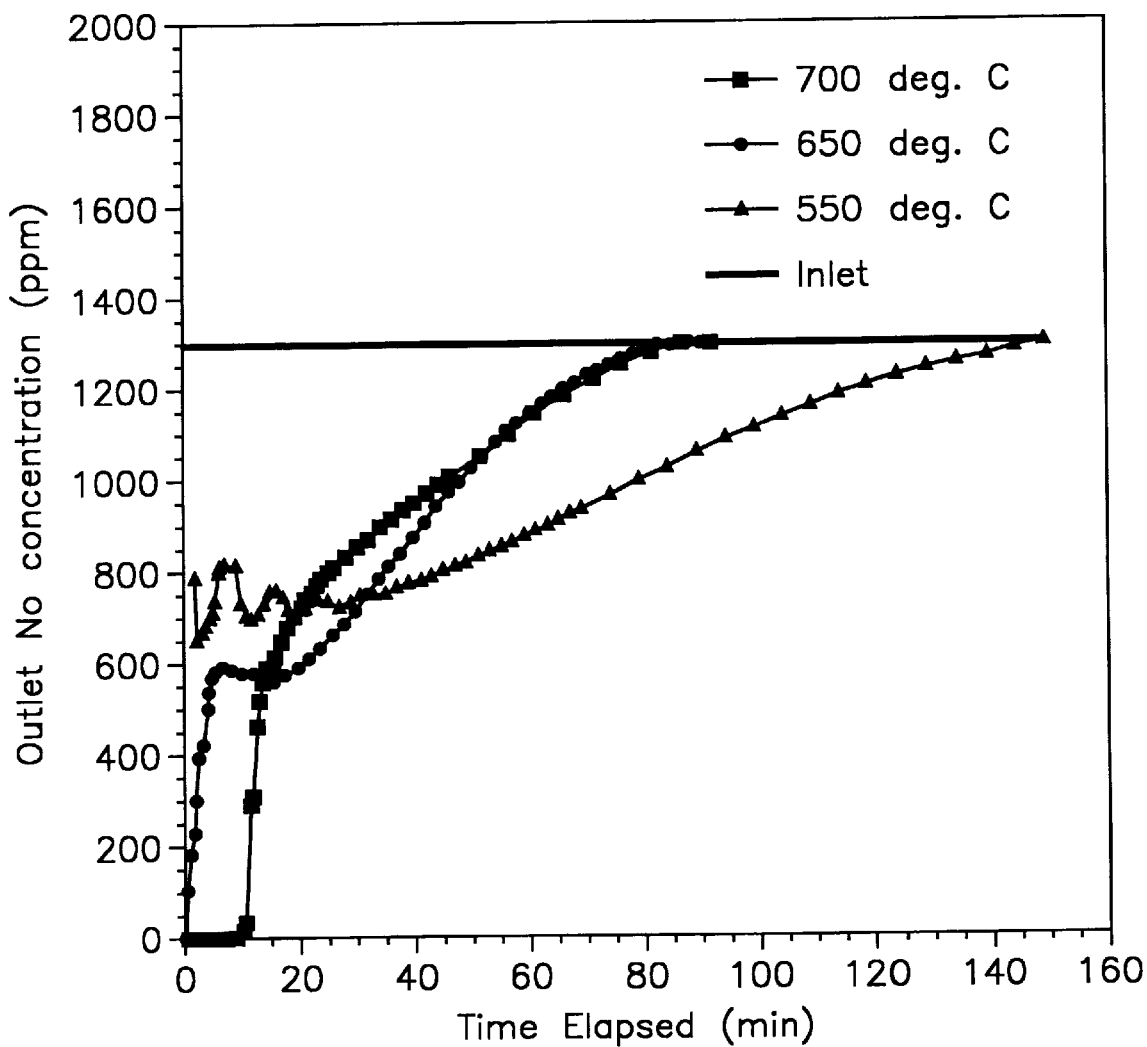
FIG. 8 shows the effect of temperature on the isothermal reduction of NO on SXO sample, in accordance with one embodiment.

The effect of temperature on the reduction of NO under isothermal conditions is shown in FIG. 8. Analysis of the data obtained at 700° C. reveals that initially the amount of carbon in the bed is sufficient to generate the required amount of active sites (by the gasification of carbon by $O_2$ and NO) necessary to react with all the NO molecules flowing past the reactor bed. However as the reaction proceeds, the mass of carbon is reduced due to its continued gasification, and subsequently the number of the free sites created on the surface of carbon are insufficient for complete removal of all the NO molecules. This leads to the passage of unreacted NO through the bed. Due to this high temperature, one can appreciate that the gasification rate of carbon is high and hence the NO concentration in the outlet increases steeply. However, at a lower temperature of 550° C., the gasification of carbon is slow and even initially, the number of active sites on the surface are insufficient to reduce all the NO molecules passing through the bed. This leads to a substantial NO concentration in the outlet stream. Since the gasification is slow, the carbon bed lasts for a longer time. Thus, high temperature leads to a higher percent NO reduction. The data also revealed that high temperature operation required a lower consumption of carbon, the requirement being 12.64, 11.78 and 10.38 g carbon/g NO reduced for 550, 650 and 700° C. respectively.

Figure 9:
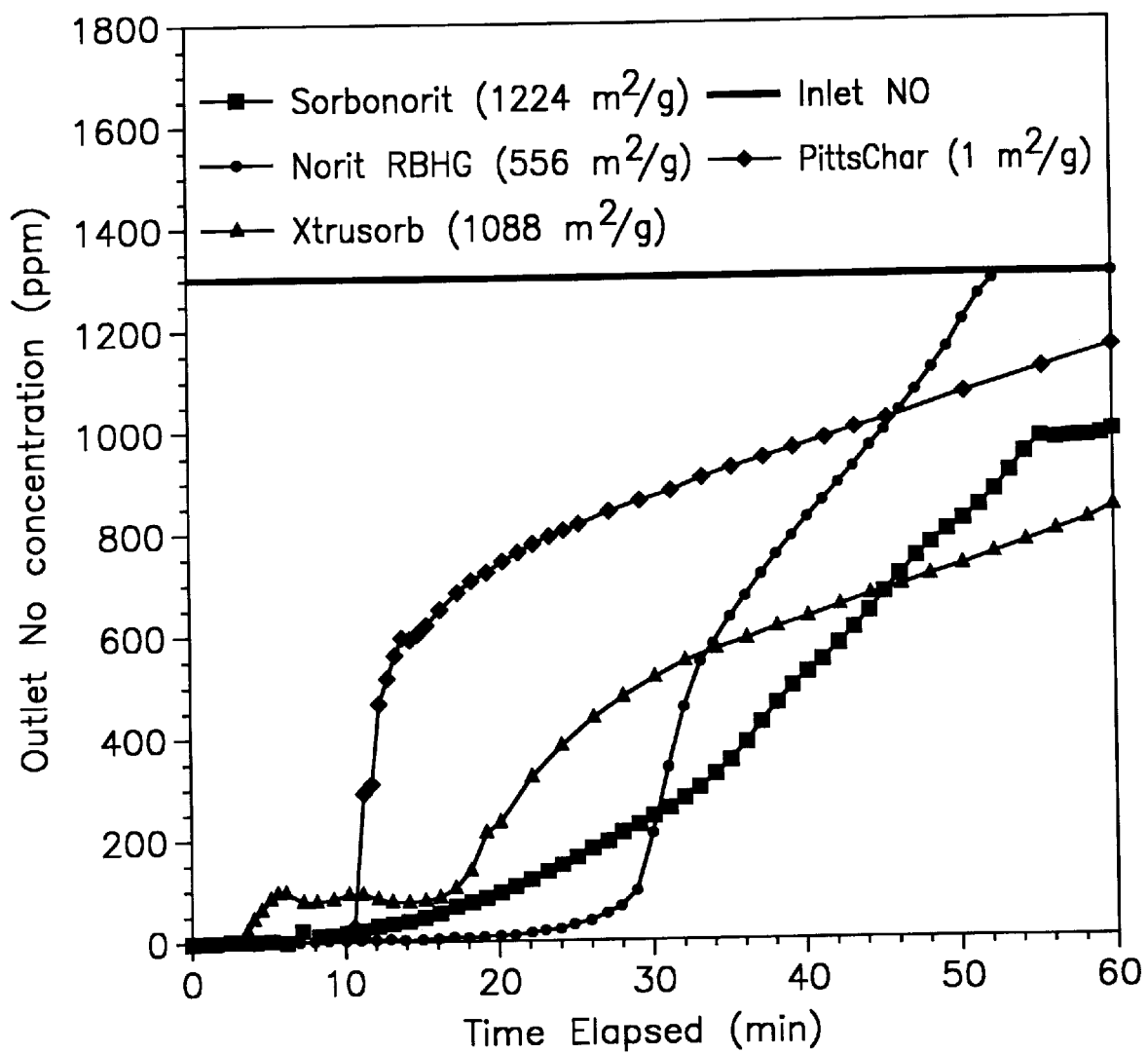
FIG. 9 shows the isothermal reduction of NO on a variety of carbon samples, in accordance with one embodiment.

FIG. 9 elucidates the performance of a variety of activated carbons differing in their surface area and pore volume on the reduction of NO compared to coal char. These activated carbons were created from different sources such as coconut and pecan shells by carbonization and steam activation. The outlet NO concentration curve shows that under identical conditions, an initial higher surface area carbon provides a higher percent NO reduction and longer breakthrough time through the bed. Data analysis showed a decrease in the g carbon consumed/g NO reduced from 11.13 (for NoritRBHG, S.A.556 $m^2/g$), 8.05 (for Xtrusorb, S.A.1088 $m^2/g$) to 7.03 (for Sorbonorit, S.A. 1224 $m^2/g$.). Analysis from this data could not be accepted as conclusive because the carbons originated from different sources and the chemical nature of the surface sites on these carbons could lead to different affinities for NO reduction. However, the indication of improving the carbon-NO selectivity by a higher initial surface area carbon seems strong. This also proves that activated char synthesized from a variety of sources is capable of reducing NO.

Figure 10:
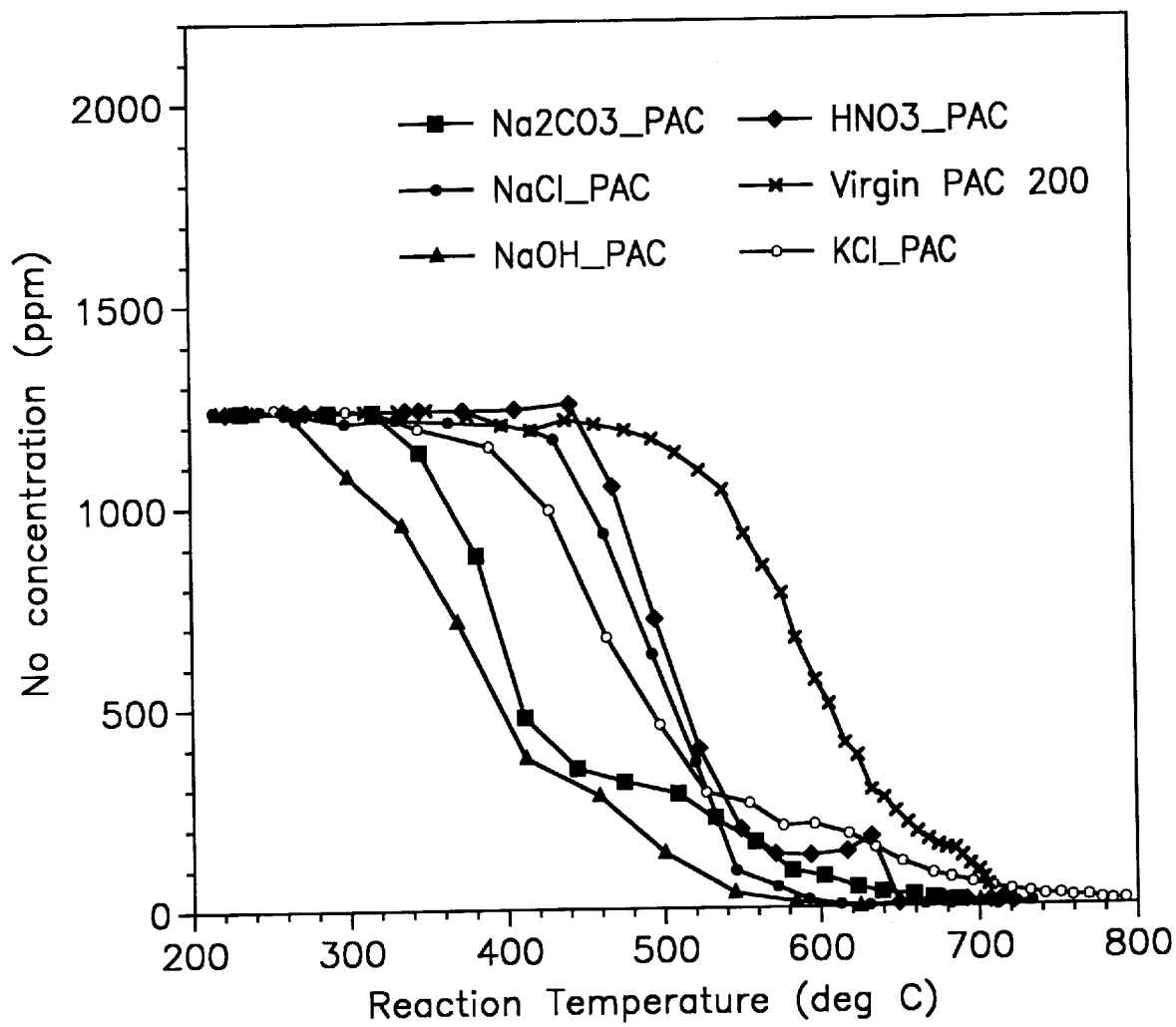
FIG. 10 shows the TPR of NO on impregnated PAC 200 carbon sample, in accordance with one embodiment.
Figure 11:
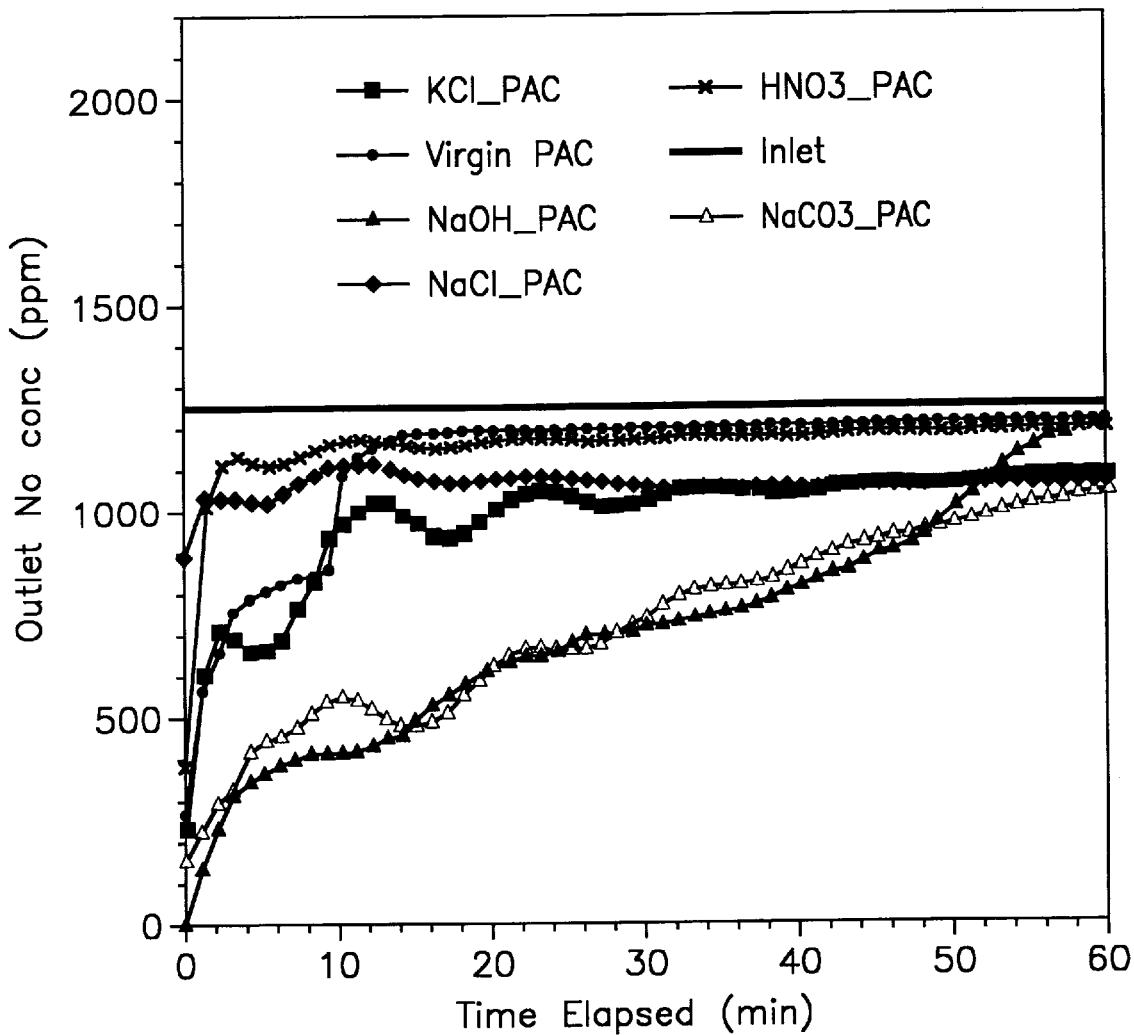
FIG. 11 is a comparison of PAC 200 sample on the isothermal reduction of NO, in accordance with one embodiment.

In order to enhance the reaction rate between carbon and oxygen and NO, the carbons were impregnated with various chemicals. A host of impregnates was used on PAC 200, a commercially available activated carbon, as described in the experimental section above. A comparative TPR for the various impregnates is shown in FIG. 10. This TPR reveals that all the chemical treatments lowered the reaction temperature window for the carbon-NO reaction, with NaOH and $Na_2CO_3$ showing the highest percent NO reduction among the impregnates tested in the present invention. This was probably because the alkali metals lead to the creation of an in creased number of active sites on the carbon surface. Isothermal experiments were also conducted at a lower temperature of 400° C., chosen because Selective Catalytic Reduction (SCR), a competing commercial technology, operates near this temperature. FIG. 11 shows the higher percent NO reduction during the initial stages due to the catalytic activity of the alkali impregnates. The carbon bed gets depleted faster because of this enhanced rate of gasification as evidenced by the steep rise in the NO outlet concentration.

Figure 12:
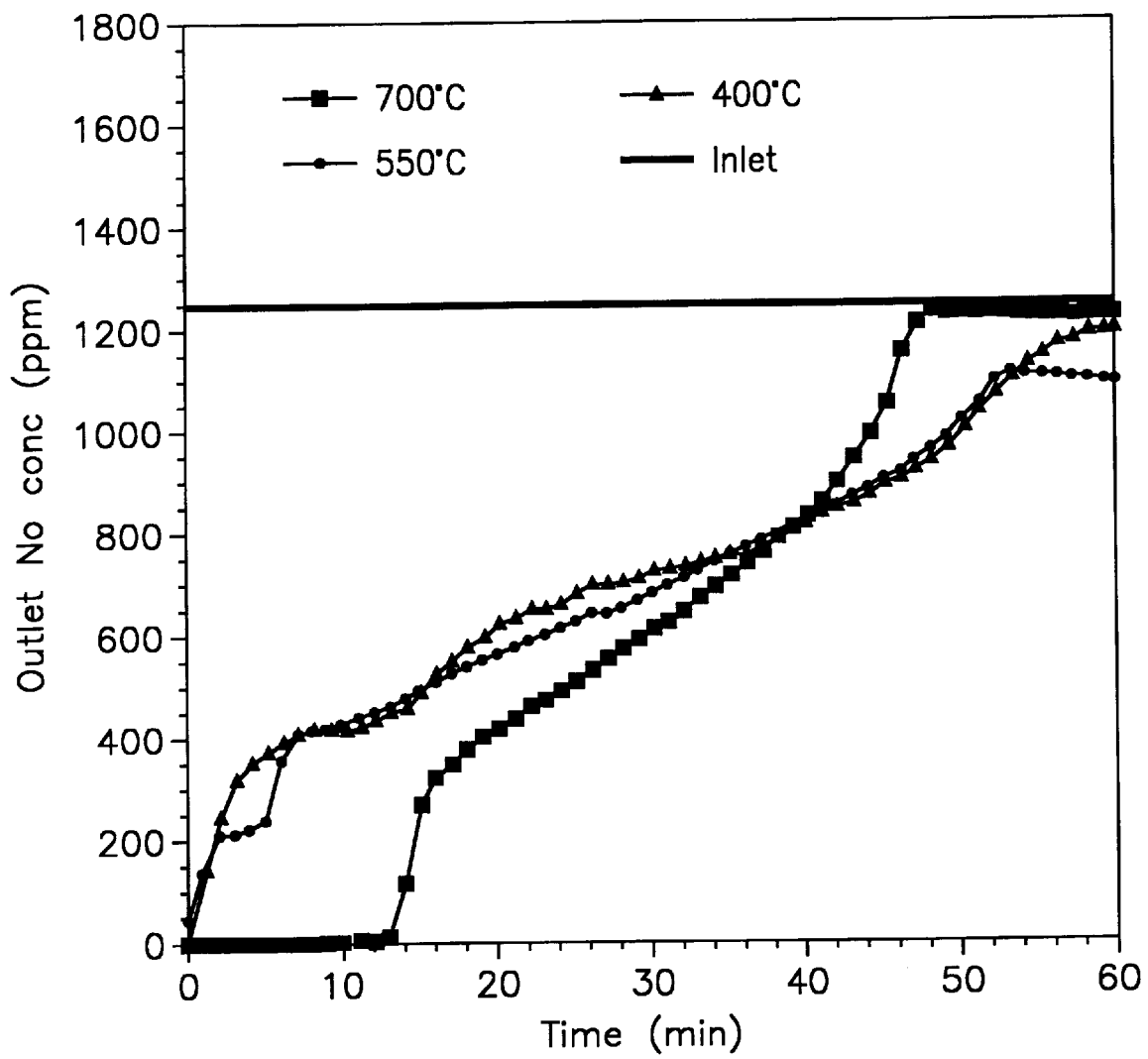
FIG. 12 shows the effect of temperature on the isothermal reduction of NO on NaOH impregnated PAC 200 carbon sample, in accordance with one embodiment.

Isothermal reactions at various temperatures conducted on the NaOH treated PAC 200 activated carbon shows that the reaction should be conducted at a higher temperature to obtain even higher extent of NO reduction (FIG. 12). The data analysis also showed that the selectivity is higher for NO with increasing temperature with the particular carbon consumption per g NO reduced being 16.7, 15.54, 13.19 for 400, 550 and 7000° C.

Figure 13:
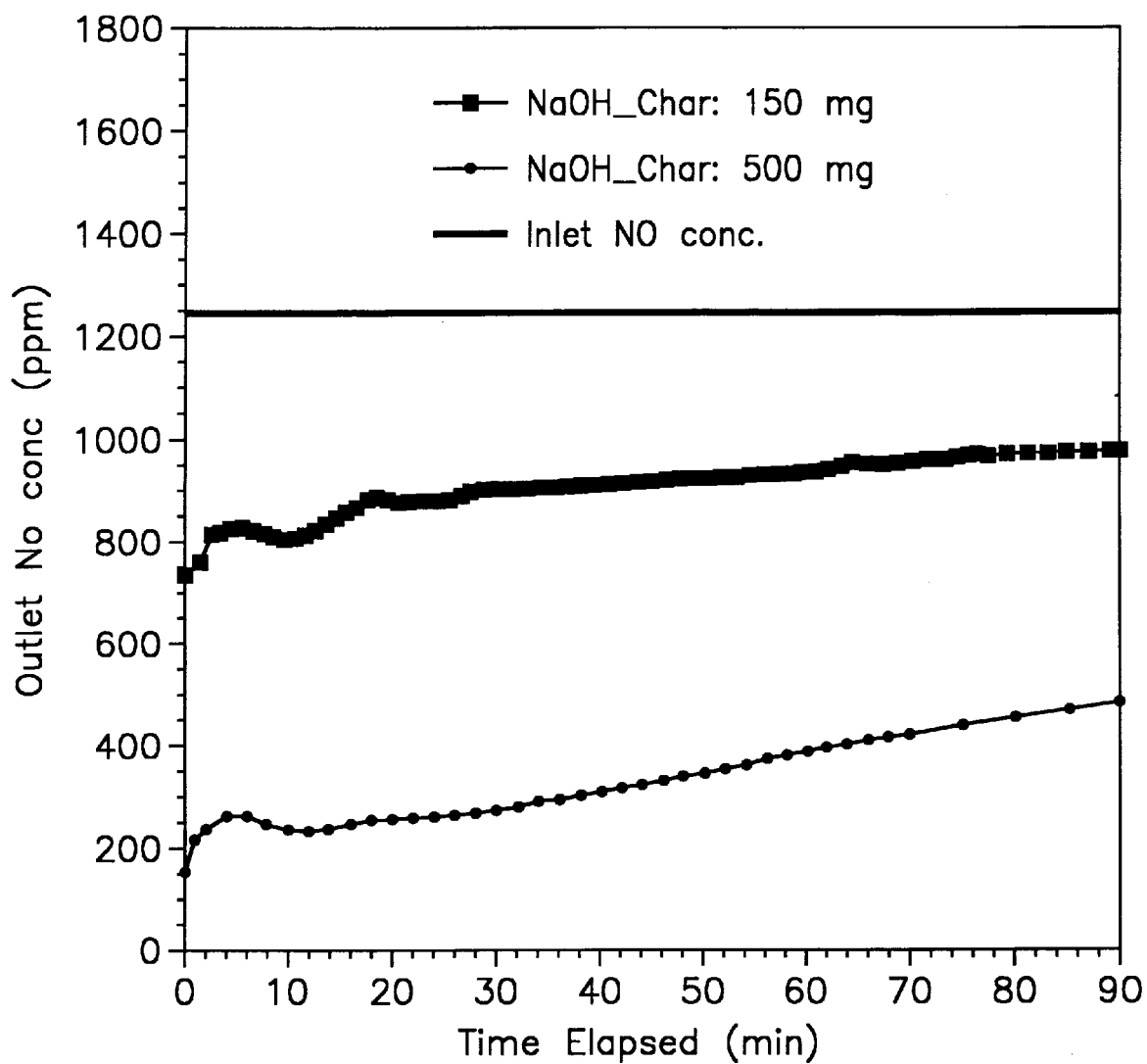
FIG. 13 shows the effect of bed height on the isothermal reduction of NO on NaOH impregnated PAC 200 carbon sample, in accordance with one embodiment.

There is no minimum thermodynamic limit on the outlet NO concentration in the product gas stream exiting from the carbon bed. This is probably because the product gases are being swept away from the reactor. Rather, in the experiments conducted, the extent of the reaction and hence the outlet NO concentration is limited by the amount of carbon in the bed. FIG. 13 shows the outlet NO concentration for two experiments carried out under identical conditions except for the differing initial mass of char used (150 mg and 500 mg). It is obvious that providing more reaction time with the carbon leads to a higher extent of NOx reduction. The overall selectivity parameter was also very close (8.65 and 9.05 g carbon/g NO reduced) showing similar behavior on scale-up of the bed.

Coal char was impregnated with sodium to different extents to study the effect of the amount of sodium loaded on the surface of carbon on the percent NO reduction. 5.0 g of char was impregnated in 200 ml of 1M, 0.1M and 0.01 M solution of sodium carbonate for 100 hours, followed by filtration and vacuum drying at 110° C. for 24 hours. It was observed that higher the amount of sodium loaded on the surface of char, higher the extent of NO reduction.

Figure 14:
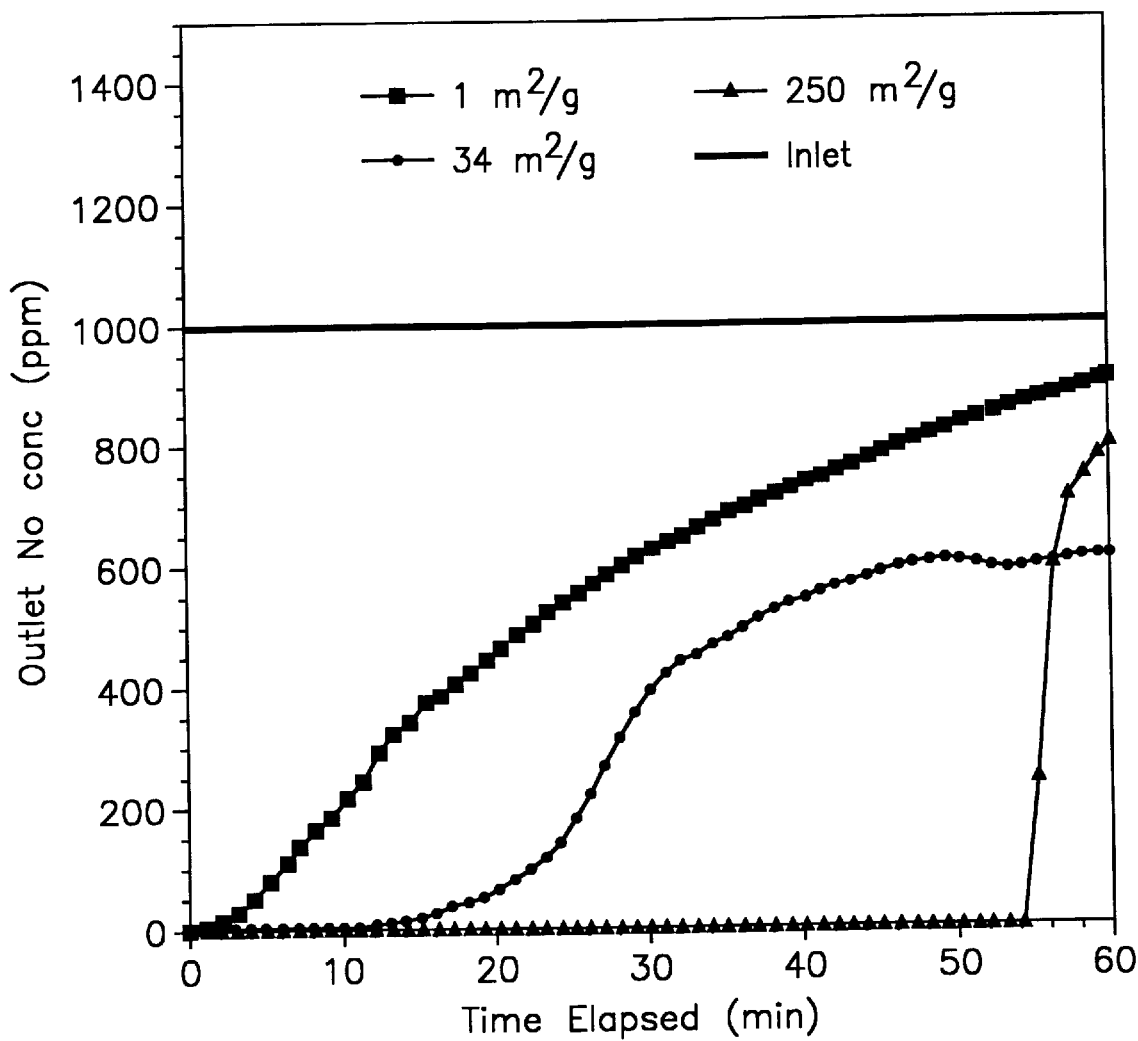
FIG. 14 shows the effect of initial surface area on the isothermal reduction of NO on activated char, in accordance with one embodiment.

In order to study the effect of initial surface area of carbon on the NO reduction, high surface area char was synthesized by carbon dioxide and steam activation. The sodium-loaded char was exposed to flowing steam (in $CO_2$ and helium) for an hour at 600–900° C., followed by drying at 100° C. The surface area increased from about 0.9 $m^2/g$ for the impregnated char to 30–50 $m^2/g$ after its activation. Similar experiments were conducted on activated (high surface area) lignite char that contained high concentrations of sodium. Dr. Edwin S. Olson (Energy and Environmental Research Center, University of North Dakota) provided the sample through Dr. Joe Oxley (298 Brevoort Road, Columbus, Ohio 43214). The high surface area of the char was obtained by exposing the high sodium lignite char to flowing steam until the desired porosity and surface are was created. Its combustion in air in the TGA indicated the presence of 19.8% ash, with a high proportion being sodium. From FIG. 14 it can be seen that a higher initial surface area char reduces NO to a greater extent. Also the selectivity improved with an increase in the surface area, with the numbers being 11.36, 9.6 and 8.2 g carbon/g NO reduced for 0.9, 34 and 250 $m^2/g$ carbon. HSLC, by virtue of its surface area and/or high sodium content showed promising results, by achieving 100% NO reduction even at 550° C. in the presence of 2% oxygen.

What is claimed is:

1. A method of removing nitrogen oxide from a combustion exhaust gas containing oxygen comprising nitrogen oxide, the method comprising:

exposing the exhaust gas containing oxygen to an activated carbonaceous material containing at least one element selected from the group consisting of alkali and alkaline earth metals and having a porosity in the range of from about 0.02456 cc/g to about 0.4 cc/g, at a temperature in the range of from about 400° C. to about 800° C. and for sufficient time so as to remove the nitrogen oxide from the combustion exhaust gas containing oxygen by reaction of said nitrogen oxide to form nitrogen and carbon dioxide.

2. A method according to claim 1 wherein the activated carbonaceous material comprises activated lignite coal.

3. A method according to claim 2 wherein the activated lignite coal comprises sodium present in an amount in the range from about 10% to about 15% by weight.

4. A method according to claim 2 wherein the activated lignite coal has an average surface area in the range from about 10 to about 400 $m^2/g$.

5. A method according to claim 1 wherein the at least one alkali and alkaline earth metal is selected from the group consisting of sodium, potassium, calcium and magnesium.

6. A method according to claim 1 wherein the at least one alkali and alkaline earth metal is presented in an amount less than about 20% by weight.

7. A method of combusting coal, the method comprising:
(1) combusting coal so as to generate a combustion exhaust gas containing oxygen comprising nitrogen oxide; and
(2) exposing the exhaust gas containing oxygen to an activated carbonaceous material containing at least one element selected from the group consisting of alkali and alkaline earth metals and having a porosity in the range of from about 0.02456 cc/g to about 0.4 cc/g, at a temperature in the range of from about 400° C. to about 800° C. and for sufficient time so as to remove the nitrogen oxide from the combustion exhaust gas containing oxygen by reaction of said nitrogen oxide to form nitrogen and carbon dioxide.

8. A method according to claim 7 wherein the activated carbonaceous material comprises activated lignite coal.

9. A method according to claim 8 wherein the activated lignite coal comprises sodium present in an amount in the range from about 10% to about 15% by weight.

10. A method according to claim 8 wherein the activated lignite coal has an average surface area in the range from about 10 to about 400 $m^2/g$.

11. A method according to claim 8 further comprising combusting the activated lignite coal following the removal of the nitrogen oxide from the combustion exhaust gas containing oxygen.

12. A method according to claim 7 wherein the at least one alkali and alkaline earth metal is selected from the group consisting of sodium, potassium, calcium and magnesium.

13. A method according to claim 7 wherein the at least one alkali and alkaline earth metal is present in an amount less than about 20% by weight.

* * * * *